April 20, 1937.  H. ARMSTRONG  2,078,115
DISPLAY APPARATUS
Filed Feb. 7, 1935  4 Sheets-Sheet 2

INVENTOR
HENRY ARMSTRONG.
ATTORNEYS

April 20, 1937.  H. ARMSTRONG  2,078,115
DISPLAY APPARATUS
Filed Feb. 7, 1935   4 Sheets—Sheet 4

INVENTOR
HENRY ARMSTRONG
By Stone, Boyden & Mash
ATTORNEYS.

Patented Apr. 20, 1937

2,078,115

UNITED STATES PATENT OFFICE 2,078,115

DISPLAY APPARATUS

Henry Armstrong, Montreal, Quebec, Canada, assignor to Vibra-Lite Limited, Montreal, Quebec, Canada, a corporation Application February 7, 1935, Serial No. 5,465

15 Claims. (Cl. 40—130)

This is a continuation in part of my United States patent application Serial No. 751,079 filed November 1st, 1934.

My present invention has to do with apparatus for illuminating displays intended to be used for advertising, educational, amusement or other purposes.

The invention appertains in particular to a display embodying a display surface including portions which differ in selective spectral absorption or selective spectral reflection, and apparatus for illuminating the said display surface with coloured light and arranged to recurrently vary the spectral characteristics of the light rays directed toward the said display surface, thereby producing an optical illusion of movement in portions of the display surface.

Exemplifying the foregoing, but without limitation as to scope of application, novel aspects of my invention reside in the provision of a display in which a portion to which it is desired to impart an appearance of animation and pulsating movement, hereinafter termed the indicia, is coloured in shades of non-neutral colour deficient in the distinguishing hue or hues of the indicia background portion the predominating hue of which is lacking in the colour formation of the indicia portions; and apparatus arranged to illuminate the said display with spectrally varying light rays in recurring cycles, to produce an appearance of pulsation in the aforesaid indicia portion, with or without directional effect, and an appearance of substantially non-flickering brilliant illumination of the aforesaid background portion, without distortion or fading of the colour thereof.

It is within the purview of my invention to provide a display of the aforesaid character formed and arranged in such manner as to avoid substantially all appearance of flickering in the illumination of those portions of the display where no appearance of animation or movement is desired; to provide apparatus for illuminating a display of the character stated in such manner that, while the illuminated display will attract the gaze of the beholder by reason of apparent animation, it will not ordinarily cause eye strain or fatigue; and to provide a display in which the background colours do not appear to be distorted or faded by successive recurrence of the light rays predominant in the distinguishing hue of the indicia portion colour.

Additional objects of my invention include the provision of illuminating apparatus which may be applied readily to standard bulletin boards, which apparatus is compact in design and does not extend far beyond the front of a bulletin board; the provision of illuminating apparatus which will not be adversely affected and the operation thereof impaired by extreme vagaries in weather conditions; the provision of illuminating apparatus in which heavy bearing loads and high surface friction velocities are avoided, thereby ensuring long life and minimum trouble; the provision of illuminating apparatus of simple design, thereby avoiding the necessity of employing highly trained service operators; the provision of illuminating apparatus in which inexpensive components, particularly lamps, are used to avoid high production and maintenance costs; and in general the provision of display apparatus which is characterized by its versatility of application, extraordinarily high degree of illuminating efficiency, and durability of design.

The improved display apparatus comprises a display surface including portions which differ in selective spectral absorption or selective spectral reflection, and means for illuminating the said display surface with coloured light and arranged to recurrently vary the spectral characteristics of the light rays directed toward the said display surface thereby producing an optical illusion of movement in one or more portions of the display surface, which means includes an illuminating unit embodying light radiating means, colour filtering means and light occulting means, one of said means being movable to disintegrate and re-combine radiation, and motivating means for the movable means.

In greater detail, the improved display apparatus comprises a plurality of illuminating units each embodying a light source a colour filter and a shutter to control transmission of light therefrom, and actuating means inter-connected to each shutter.

The invention consists of the features and combinations of features as hereinbefore and hereinafter described and/or illustrated in the accompanying drawings together with all such equivalents therefor and modifications thereof as lie within the scope of the appended claims.

In the accompanying drawings which illustrate a suitable embodiment of the invention, but to the details of which the invention is not confined:—

Figure 1:
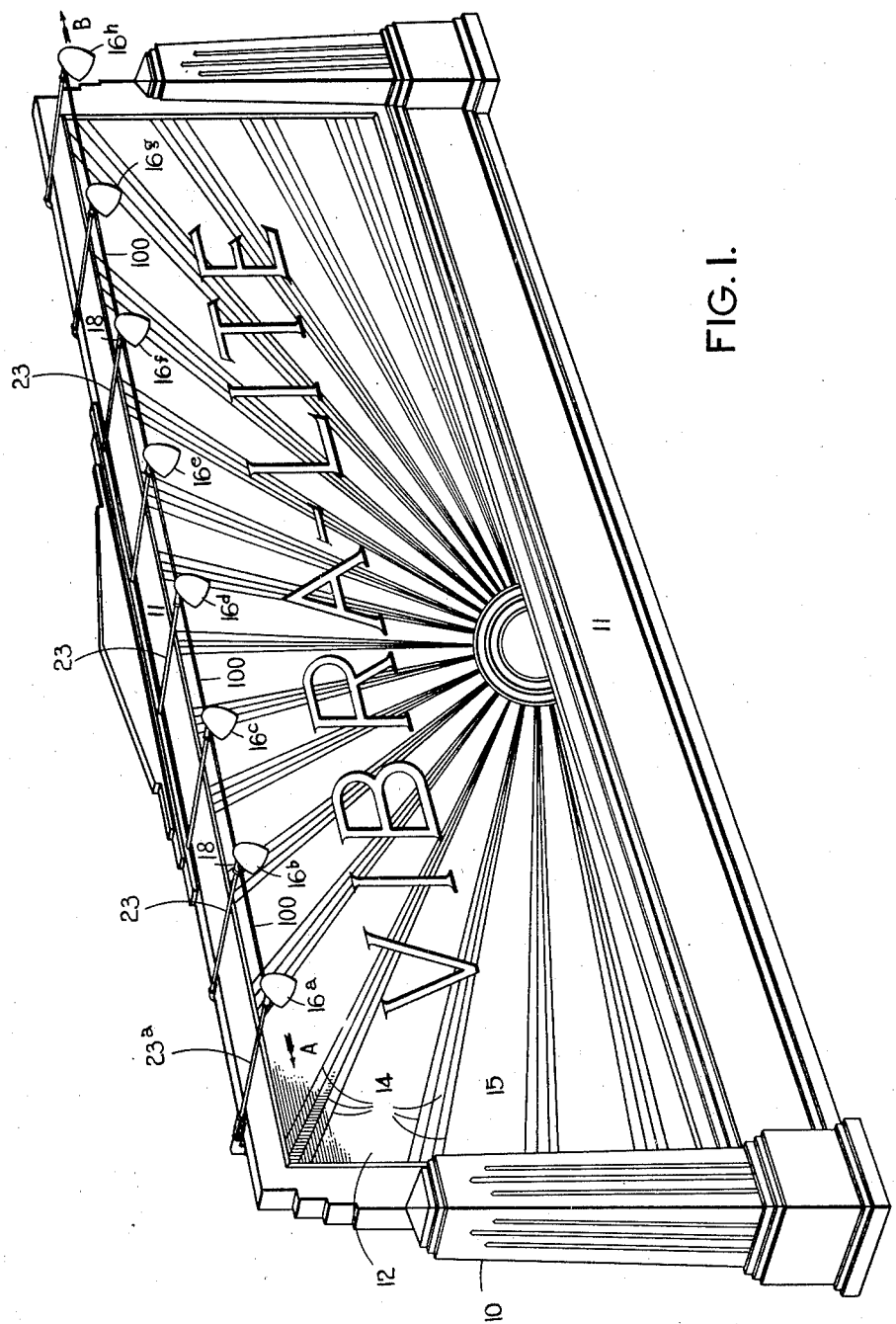
Fig. 1 is a perspective view of a bulletin board equipped with apparatus according to my present invention.

In the description which follows, reference is made to "display surface", and this term is intended to cover any surface of any character whatsoever upon which there is represented matter to be displayed and regardless of the character of the matter.

By "indicia" I mean letters, figures, arbitrary designs or pictorial representations of objects or parts of objects, to which the attention of an observer is to be particularly directed or which serves to direct attention to the whole or some part of the remainder or background of the sign display surface for the purpose of conveying or emphasizing the message which the sign is designed to give. The indicia may be found at a single location or at a plurality of spaced locations in the display surface and may constitute one portion of the sign, the other portion being the background.

The term "background" is to be understood as indicating primarily those portions of the display immediately in contact with or appearing to be in contact with the edges of the indicia and may extend to as much else of the display, other than the indicia, as desired.

"Neutral colours" refer to such colours as do not materially change under the spectral colours by which the indicia and background areas are displayed, or in other words, those which display no decided colour characteristics such as relate to primary or non-neutral colours, and remain of the same apparent density under complementary or primary coloured light rays.

The term "light" means, according to context, the light as it emanates from a source or as it is modified by passage through a colour screen or filter, or by reflection or refraction.

The characteristics and colour values of the light and the indicia and background portions or areas of the display surface are predetermined according to the known laws governing reflection and absorption of light of various wave lengths, with reference to one another, such that one distinguishing hue is common to one light colour and one display surface colour, and another distinguishing hue is preferably common to another light colour and another display surface colour, the former distinguishing hue being deficient in the distinguishing hue of the latter.

According to the annexed drawings the light source illustrated is in the form of an incandescent filament lamp, but nevertheless other means may be adapted for such use and therefore the term herein used is intended to include all suitable means such as gaseous tubes or lamps, electric arc devices and such like, or the equivalent thereof.

Referring now to the drawings in greater detail, the numeral 10 designates a bulletin structure in its entirety. A very brief description of the bulletin structure per se will suffice, since the particular type of "sign" is immaterial to the invention which has a wide range of applicability to various kinds of display devices, irrespective of the specific form illustrated. The bulletin structure depicted includes a front or frame face 11, a display surface 12, and the frame structure generally designated by the numeral 13. The frame structure 13 is located at the rear of the display surface 12, and is employed to support the latter and the frame face 11.

The display surface 12 which has been illustrated for explanatory purposes is an advertising sign including indicia 14 contrastingly coloured with respect to the background 15. The indicia 14 comprise a sun-burst including lines and narrow bands or stripes radiating from a pictorial representation of a portion of the sun, located centrally of the lower portion of the display surface. The trade name "Vibra-Lite" appears in a neutral colour, for example "white", for purposes of explanation which follows hereinafter.

For the purposes of this invention it is desirable that the indicia be coloured in a non-neutral colour, the predominating hue of which is deficient or absent in the colour of the immediately adjacent background and that the background immediately adjacent the indicia be coloured in a colour preferably non-neutral, the predominating hue of which is deficient or absent in the colour of the indicia. Colours which are most suitable for the indicia are those in which red predominates while colours most suitable for the background immediately adjacent the indicia are those in which green or blue predominate, as depicted in Fig. 1. In order to obtain the aforesaid effect of animation or pulsating movement in the indicia when illuminated as described, it is essential that non-neutral or nearly non-neutral colour intervene between the indicia colour and the immediately adjacent substantially non-neutral background colour. In other words, the non-neutral indicia colour and the significant background colour, which is substantially non-neutral and preferably complementary to the indicia colour, must be or appear to be in contact as edges of the indicia. The term "background colour" is therefore to be understood as indicating primarily the colour immediately adjacent the edges of the indicia.

A plurality of illuminating units designated by the reference characters 16a, 16b, 16c, 16d, 16e, 16f, 16g and 16h are arranged forward of the front of the bulletin structure, and in a horizontal plane at a slightly higher elevation than the top of the display surface 12. The said units are arranged in equidistant horizontal spaced relation so as to effect substantially uniform illumination of the said display surface.

Each said illuminating unit comprises a housing 17, preferably in the form of a deep drawn metal shell, to which is tightly secured a casting 18, by screws 19 and nuts 20. The said casting includes a sleeve 21 which is internally machined to receive the machined end 22 of the supporting pipe 23. The casting 18 is secured to the said pipe by the draw nut 24 and compression ring 25. Within the housing is mounted the lamp socket 26 on the frame 27, which in turn is fastened to the ring member 28, the latter being spot welded to the housing 17. A lamp 29 is supported by the said socket, and 30 designates electric circuit wires leading to the latter from circuit mains, not shown. A reflector 31 is arranged circumjacent to the lamp 29 and is supported by the member 32, which is fastened to the member 27, and the member 33 which is fastened to the brackets 34, one only of which is shown, the same being welded to the housing 17. The reflector illustrated is preferably formed of glass and is surfaced externally with silver. Its function is to reflect light emitted from the lamps 29 against the colour filter generally designated by the numeral 35. The said lamp, reflector and colour filter are so formed and arranged that the greater part of the light beam emitted by the said lamp and in part reflected by the said reflector impinges the said colour filter.

The colour filter of each said illuminating unit includes metal frame sections 36 and 37, between which are secured sections of colouring media, for example glass. According to the present adaptation of the invention, each said illuminating unit is designed to flood the display surface 12 continuously with light of a colour deficient in the distinguishing hue of the indicia, for example with blue light, and intermittently with light of a colour deficient in the distinguishing hue of the background and preferably corresponding in colour with the colour of the indicia, for example red. Accordingly, a plurality of sections 38 of the colour filter 35 are blue and transmit blue light, and sections 39, one arranged at each side of each section 38, are red and transmit red light. Between each two immediately adjacent sections of red media 39 is arranged a portion of opaque material 40, herein shown as part of the metal frame sections 36 and 37. The contrastingly coloured filter sections 38 and 39 are arranged as illustrated to effect substantially uniform distribution of coloured light over the entire display surface 12 of the bulletin structure 10. The colour filter 35 in its entirety is articulated by the hinge 41, fastened thereto and to the housing 17, and is secured at the opposite side thereof to the casting 18 by screws, one of which is shown at 42. Upon removal of the said screws, the colour filter may be swung downwardly, about the hinge pintle, to gain access to the lamp 29, for replacement purposes.

Figure 4:
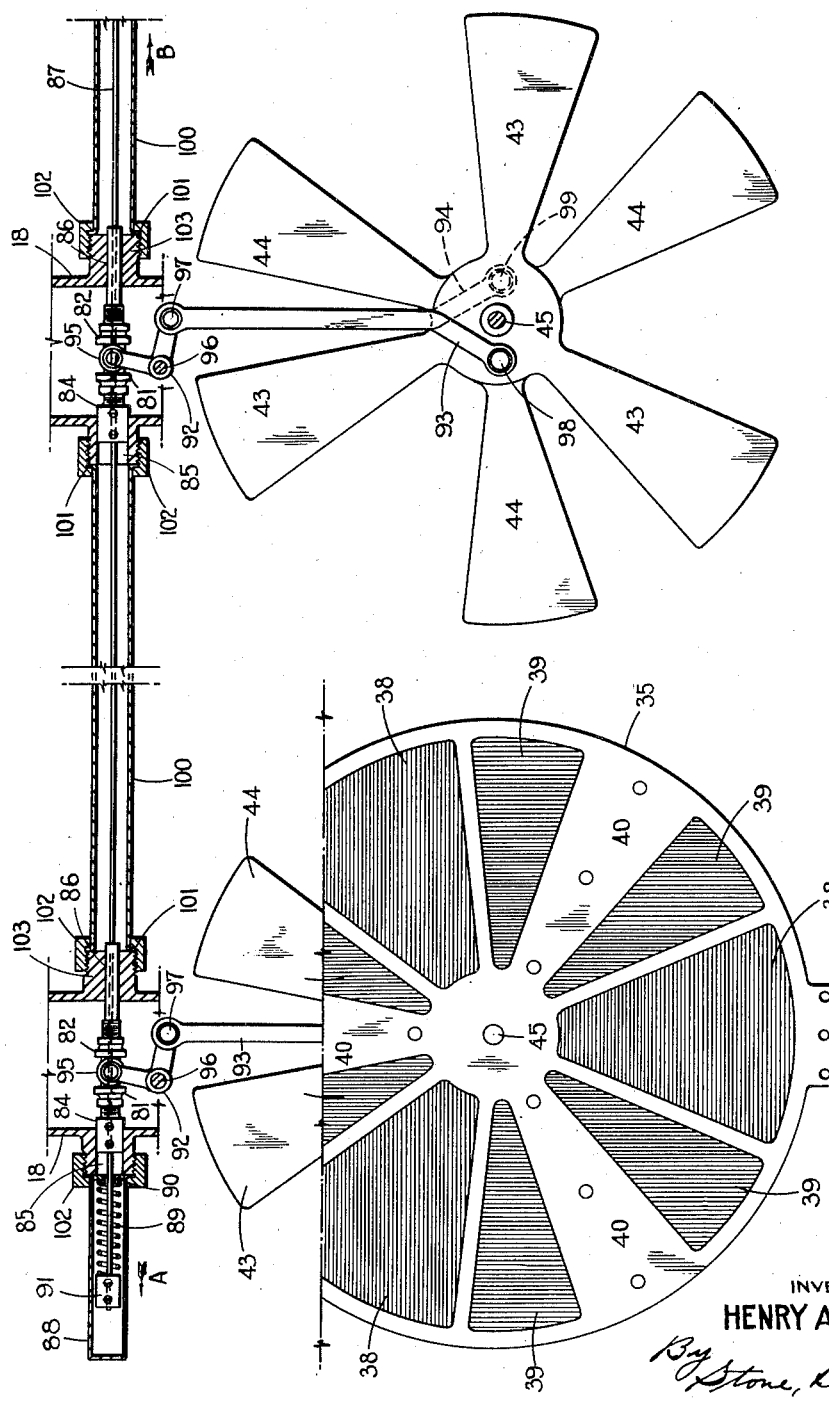
Fig. 4 is a detail view, partly in section and partly in elevation, showing the shutter mechanism of two of the illuminating units, and a portion of a colour filter in proper co-relation with respect to one shutter mechanism.

Between the lamp 29 and the colour filter 35 is arranged light transmission control means, adapted to govern passage of light emitted from the lamp 29 through the colour filter sections 39. The said means are preferably in the form of two movable shutters, indicated generally by the numerals 43 and 44. The said shutters are pivoted, close to one another, on the pivot pin 45 which is secured to the frame section 37 of the colour filter 35, substantially centrally thereof. Each shutter referred to includes three blades, adapted when positioned as shown in Fig. 4, to cover three of the six colour filter sections 39, so that the both shutters, in the position shown, cover all of the colour filter sections 39 and prevent transmission of light, emitted from the lamp 29, therethrough. In such position, light emitted from the lamp 29 will filter through the blue sections 38 only.

As before premised, the shutters 43 and 44 function to govern transmission of red light from the colour filter in such wise that passage of red light is intermittently impeded. In the position shown in Fig. 4, passage of light through the filter sections 39 is impeded by the said shutters. To permit passage of light, the said shutters are so shifted that the blades thereof are positioned behind the opaque sections 40 of the colour filter frame, in which position they do not overlap the red colour filter sections 39.

Shifting of the shutters 43 and 44 to alternately cover and clear the sections 39 of the colour filter 35 is effected mechanically. The source of motive force for actuating the said shutters may be in the form of an electric motor, indicated at 46 in Fig. 5. A belt 47 is trained over the motor shaft pulley 48 and the pulley 49 mounted on the intermediate shaft 50, which in turn is journaled in the bearing unit 51. A second belt, indicated at 52, is trained over the pulley 53 mounted on the shaft 50 and the pulley 54 mounted on the cam shaft 55, the latter being journaled in the bearing unit 56. The said bearing units and the motor are mounted on the base channel 57, to which is attached the bracket 58. A pivot pin 59 is supported by the said bracket and a rocker arm 60 is mounted on the said pivot pin. A roller 61 is carried by one end of the said rocker arm, and bears against the periphery of the cam 62 mounted on the shaft 55. The contour of the said cam embodying the ridge 62a, is such that upon rotation thereof, oscillating or rocking motion is imparted to the said rocker arm. A connecting yoke 63 is articulated to the rocker arm 60 and a motion transmitting flexible wire 64 is attached at one end thereof to the said connecting yoke.

Figures 5, 6:
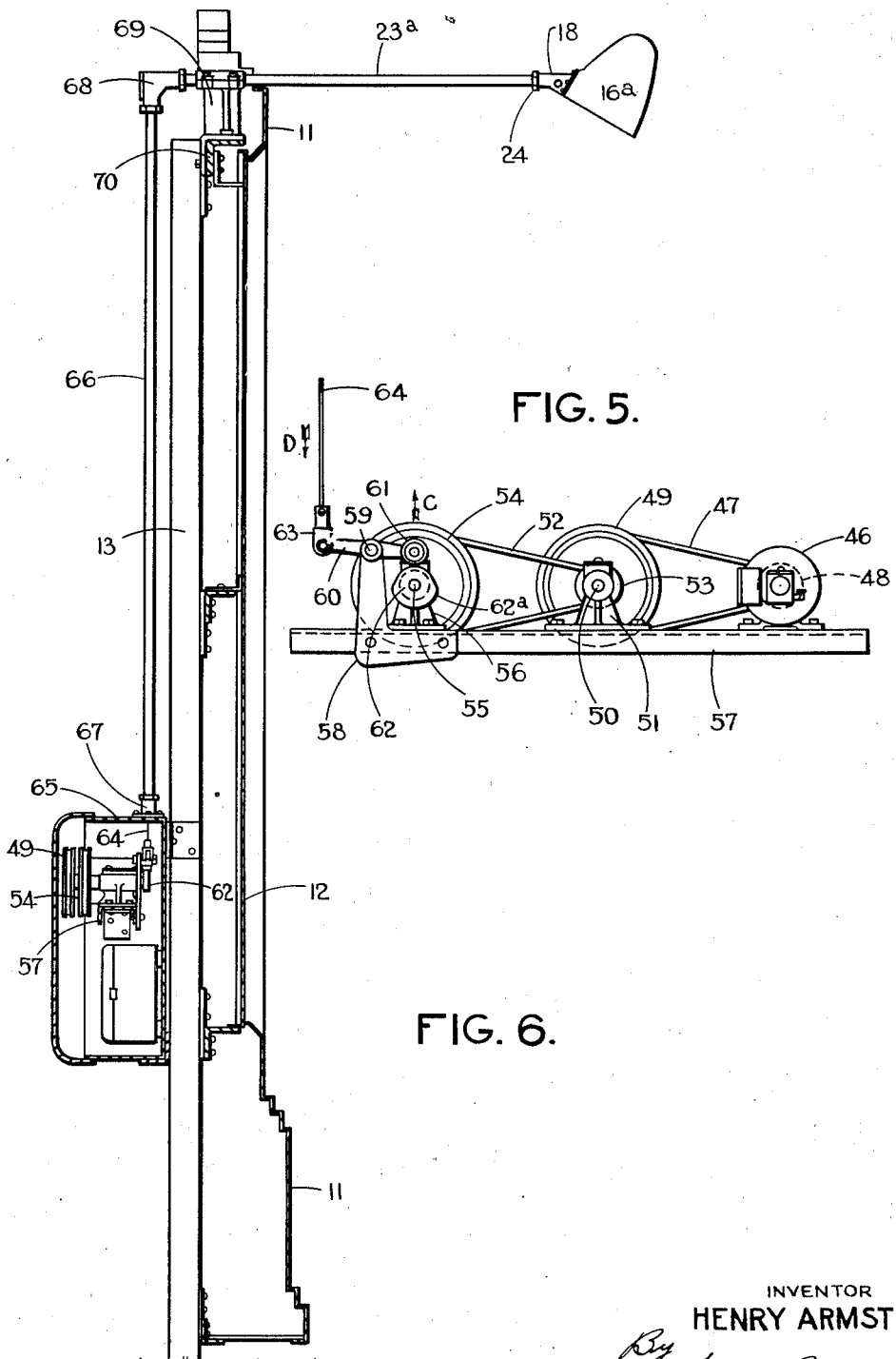
Fig. 5 is an elevation, drawn at a smaller scale than Figs. 2, 3 and 4, showing part of the shutter powering means.
Fig. 6 is a vertical sectional view of the bulletin structure shown in Fig. 1, drawn at a larger scale than the former view, showing the co-relation of an illuminating unit and part of the shutter powering means.

The mechanism illustrated in Fig. 5 is arranged at the rear of the bulletin structure and is housed by the control box 65, the latter being supported upon the bulletin frame structure 13. The wire 64 extends from the connecting yoke 63 upwardly through the tubular member 66, which is secured at its lower end to the coupling 67 attached to the control box 65, and at its upper end to the casting 68 secured to the rear end of the pipe which supports the illuminating unit 16a located near the left end of the bulletin structure. In order to identify the said pipe from the other pipes designated at 23, it is indicated by the reference character 23a. Pipe 23a is supported by the bracket 69 mounted upon the upper stringer 70 of the bulletin frame structure 13.

Pipes 23 supporting the said illuminating units, other than the pipe immediately heretofore referred to, are supported by brackets, not shown, mounted upon the stringer 70, which brackets are equivalent from a functional viewpoint to the bracket 69, illustrated in Fig. 6.

Figures 2, 3:
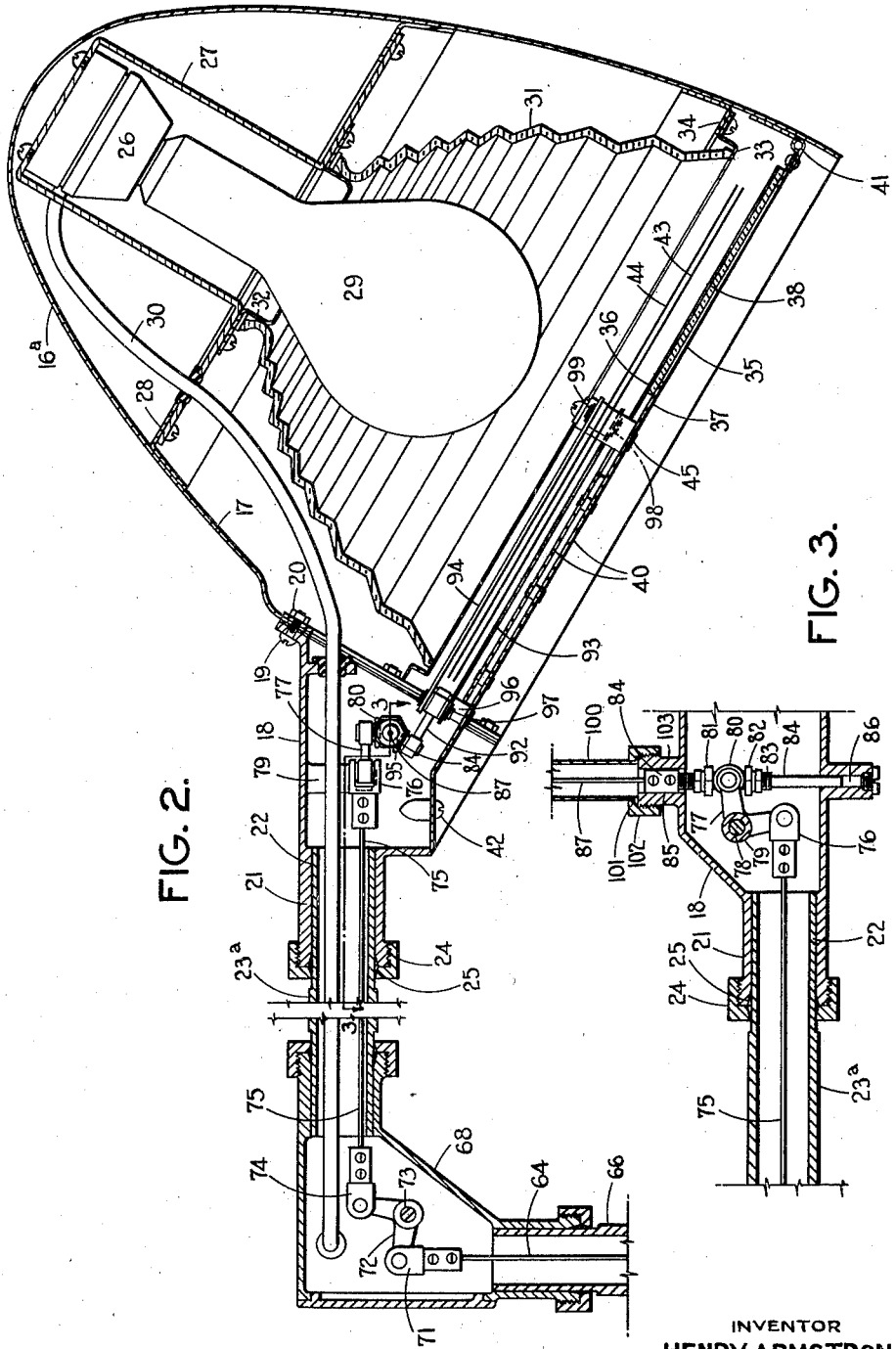
Fig. 2 is a longitudinal vertical sectional elevation of one of the bulletin board illuminating units.
Fig. 3 is a fragmentary horizontal sectional elevation of part of the light transmission controlling shutter actuating means, the view being taken on the planes designated by line 3—3 appearing on Fig. 2.

Referring now to Figs. 2 and 3, the upper end of the wire 64 is connected to the connecting yoke 71, which in turn is articulated to one arm of the bellcrank 72 pivoted on the pin 73. The other arm of the bellcrank 72 is articulated to the connecting yoke 74, which is attached to one end of the motion transmitting flexible wire 75 which extends through the pipe 23a and is connected to the connecting yoke 76. The latter is articulated to one arm of the bellcrank 77 pivoted on the pin 78 extending from the boss 79 integral with the casting 18. The other arm of the bellcrank 77 carries a small roller 80 which is positioned between the adjustable nuts 81 and 82 engaging the threaded shank 83 of the guide pin 84, clearly shown in Fig. 3. The said guide pin is slidably supported in reamed apertures 85 and 86 in the casting 18 mounted on the pipe 23a, shown in Fig. 2.

Casting 18 of each said illuminating unit is formed similar to the aforementioned casting 18 mounted on pipe 23a, and a guide pin 84, similar to that previously described, is slidably supported in each casting 18, in the manner described, and as shown in Fig. 4. A motion transmitting flexible wire 87 is connected at one end of the guide pin 84 shown in Figs. 2 and 3, extends from illuminating unit to illuminating unit, passes longitudinally through and is fastened to the guide pin 84 of each said unit. The casting 18 of the illuminating unit 16h located near the right end of the bulletin structure shown in Fig. 1 is connected with a tubular enclosure 88, within which is positioned a coil spring 89, one end of which bears against the retaining washer 90. The other end of the said coil spring abuts a collar 91 mounted near the end of the wire 87. The function of the said coil spring is to urge the said wire 87 in the direction of arrow A, appearing in Figs. 1 and 4, and the function of the mechanism including bellcrank 77, wire 75, bellcrank 72, wire 64, rocker arm 60, cam 62, and rotating means for the latter, is to alternately pull the wire 87 in the direction of arrow B, appearing in Figs. 1 and 4, thereby effecting compression of the said spring intermittently.

Motion is transmitted from the guide pins 84 to the shutters 43 and 44 of each illuminating unit by the bellcrank 92 and the links 93 and 94. A roller 95 is mounted on one arm of the said bellcrank and fits between the nuts 81 and 82 on the guide pin 84. The said bellcrank is pivoted on the pin 96 secured to the filter frame section 37, clearly shown in Fig. 2, and one arm of the said bellcrank is articulated to the links 93 and 94 by the pin 97. Link 93 is articulated to the shutter 43 by the pin 98, and the link 94 is articulated to the shutter 44 by the pin 99.

The illuminating units designated by the reference characters 16a to 16h inclusive, are retained in spaced relation by the tubular members 100. The ends 101 of the latter are flared outwardly and are engaged by the draw nuts 102 threaded onto the bosses 103 integral with the castings 18. The tubular members also serve as enclosures for the shutter actuating wire 87 which extends longitudinally therethrough, as clearly shown in Fig. 4.

In Fig. 4 I have illustrated the shutter mechanism of the two illuminating units designated by the reference characters 16g and 16h, in order to clearly depict the co-relation of the wire 87 and associated shutter actuating means with respect to a plurality of illuminating units. In Fig. 4 the shutters 43 and 44 are shown in light impeding position, with the wire 87 retracted in the direction of arrow B, and the coil spring 89 under compression. For purpose of comparison, the associated shutter actuating mechanism is shown in Figs. 2, 3 and 5 in the position occupied thereby when the shutters 43 and 44 do not overlap the sections 39 of the colour filters 35.

It is to be understood that the lamps 29 of the respective illuminating units and the electric motor 46 may be arranged according to standard wiring practice in circuits connected to a source of current supply, and that the same may be governed by a time clock and other control instrumentalities according to established practice.

*Operation*

Assuming for purposes of explanation that the lamps 29 and the electric motor 46 are electrically energized, the display surface 12 is constantly flooded with blue light, and is intermittently flooded with red light, by reason of actuation of the shutters 43 and 44.

Actuation of the shutters 43 and 44 of each illuminating unit is effected upon energization of the electric motor 46, from which torque is transmitted by the pulley 48, the belt 47, the pulley 49, the shaft 50, the pulley 53, the belt 52, and the pulley 54 to the shaft 55, which effects rotation of the cam 62, and in turn movement of the rocker arm 60. Each time the shaft 55 revolves, the ridge 62a of the cam 62 forces the roller 61 on the rocker arm 60 upwardly, as indicated by the direction arrow C, and this action in turn pulls the wire 64 downwardly, as indicated by the direction arrow D. Wire 64 being interconnected with wire 87 through the components 71, 72, 74, 75, 76, 77, 80 and 84, upon movement as above referred to, effects movement of the wire 87 in the direction of arrow B, and compression of the spring 89. Since the guide pin 84 of each illuminating unit is attached to the wire 87, all of the said guide pins are shifted simultaneously, with the result that all the bellcranks 92 are oscillated and the interconnected links 93 and 94 shift the shutters 43 and 44 of each illuminating unit respectively in counter-clockwise and clockwise directions so that the said shutters are positioned, when the roller 61 is in contact with the ridge 62a of the cam 62, as shown in Fig. 4. In this position, the red sections 39 of the colour filter are covered by the blades of the said shutters, and transmission of light from the lamps 29 through the said colour filter sections is impeded.

Continued rotation of the cam 62 causes the roller 61 to ride off the cam ridge 62a, with the result that the spring 89 is permitted to expand and shift the wire 87 in the direction of the arrow A. Such movement of the wire 87 effects simultaneous movement of all the guide pins 84, rocking of all the bellcranks 92, and movement of all the links 93 and 94, in such manner that the blades of the shutters 43 and 44 are shifted, respectively in clockwise and counter-clockwise directions into concealment behind the opaque sections 40 of the colour filters 35, in which position they clear the sections 39 thereof and light from the lamps 29 is now transmitted through the blue sections 38 and the red sections 39 of the said colour filters.

From the above it is clear that upon one complete revolution of the cam 62, the shutters 43 and 44 are shifted from the position depicted in Fig. 4 into concealment behind the opaque sections 40 of the said colour filters, and are subsequently returned to the position illustrated by Fig. 4. It follows therefore that upon each revolution of the cam 62 red light is caused to be momentarily transmitted from the sections 39 of the colours filters 35 to the display surface 12, and is subsequently cut off. In other words, during each revolution of the cam 62, there occurs a period of illumination of the display surface 12 with red light transmitted from the colour filter sections 39, followed by a period of non-illumination with light of the aforesaid colour.

Assuming for purposes of explanation that the display surface 12 embodies a display including red indicia 14 on a blue background 15, with other display matter in neutral colour, for example the word "Vibra-Lite" in white. Assume also that sections 38 and 39 of the colour filters 35 are coloured blue and red respectively. Furthermore, let it be assumed that the lamps 29 and electric motor 46 are energized, and that the shutters 43 and 44 of each illuminating unit are being actuated at a frequency of 200 oscillations per minute.

Accordingly, the display surface is continuously flooded with blue light transmitted from the blue sections 38 of the colour filters 35, and intermittently with red light transmitted from the red sections 39 of the said colour filters. The blue background 15 and the word "Vibra-Lite" appear continuously and brilliantly illuminated and each in its own colour without motion or eye fatiguing, flickering effect, while the indicia 14 appear brilliantly illuminated in red and appear to have a pulsating and vibrating movement.

The frequency of recurrence of the periods of illumination with the red light have been, for purposes of explanation, set at 200 per minute, but it is to be clearly understood that such frequency may be altered by control of the speed of revolution of the cam 62, to effect any frequency required, as determined by the subject matter on the display surface 12. It is to be understood, however, that the frequency of recurrence of the periods of illumination with the red light are preferably such that by reason of the persistence of vision the observer of the display surface 12 is not conscious of definite intervening periods of non-illumination with red light.

Owing to continuous illumination of the display surface with light of one colour (blue) the colour of the background 15 and the word "Vibra-Lite" do not appear to be affected or altered by the intermittent illumination with light of the other colour (red). Each of these parts or areas of the display surface 12 appears in substantially its own colour and brilliantly illuminated without perceptible variation in intensity, that is, without flickering.

I claim:

1. In display apparatus of the character described, the combination with a display surface of a plurality of illuminating units arranged to flood the said display surface with light, each of which illuminating units includes a light source, a colour filter, and an oscillatable shutter to control transmission of light from said light source to the said display surface; and means for simultaneously oscillating the shutters of the said plurality of illuminating units.

2. In display apparatus of the character described, the combination with a display surface of a plurality of illuminating units arranged to flood the said display surface with light, each of which illuminating units includes a light source, a colour filter, and an oscillatable shutter to control transmission of light from said light source to the said display surface; and motivating mechanism including a prime mover, arranged to actuate the said shutters in synchronism.

3. In display apparatus of the character described, the combination with a display surface of a plurality of illuminating units arranged to illuminate the said display surface, each of which illuminating units includes a light source, a colour filter, and a shutter adapted to govern passage of light from said light source to the said display surface; a common driving element operatively co-related with the said shutters, adapted upon actuation to effect opening and closing of the said shutters; and motivating means arranged to impart to and fro motion to the said driving element.

4. Display apparatus of the character described including, in combination, a plurality of relatively spaced illuminating units, each including means to establish coloured light and control means adapted to govern projection of coloured light; a driving element operatively co-related with all the said control means, adapted upon actuation to effect simultaneous operation of the said control means; and motivating means arranged to impart to and fro motion to the said driving element.

5. In combination, a plurality of relatively spaced illuminating units, each of which units includes means to effect projection of coloured light and movable control means arranged to govern projection of coloured light; and actuating means arranged to effect movement of the said control means, said actuating means including a flexible drive element extending from illuminating unit to illuminating unit, means to impart to and fro motion to the said drive element, and means co-acting the control means of each illuminating unit with the said drive element in such wise that actuation of the said drive element effects operation of the plurality of control means in synchronism.

6. In combination, a plurality of relatively spaced illuminating units, each said unit including means to establish coloured light and shutter means adapted to intermittently impede projection of coloured light; and actuating means arranged to effect operation of the shutter means of each said unit, the said actuating means including a flexible member extending from unit to unit and operatively interconnected with the shutter means of each said unit, and means to effect reciprocation of the said flexible member.

7. In display apparatus of the character described, the combination with a display surface, of means arranged to intermittently illuminate the said display surface with coloured light, including means to establish coloured light, a shutter adapted to be intermittently actuated to govern passage of light from the said light source to the said display surface, and means to effect intermittent actuation of the said shutter.

8. Apparatus for illuminating a display surface including a light source; a reflector arranged to reflect light emitted from the said light source; a colour filter positioned in close proximity to the said light source and the said reflector, adapted to colour light emitted from the said light source and light reflected by the said reflector; and a shutter arranged between the said light source and the said colour filter, the said shutter being formed and arranged in such manner that upon actuation thereof it functions to intermittently impede transmission of light from the said light source and the said reflector to a portion of the said colour filter; and means to effect intermittent movement of the said shutter.

9. Illuminating apparatus of the character set forth including a light source; a colour filter embodying a plurality of coloured light filter sections, arranged to be flooded with light emitted from the said light source; a shutter arranged between the said light source and the said colour filter, the said shutter being formed and arranged in such manner that in one position it impedes projection of light from the said light source through one of the said colour filter sections, and when adjusted to another position it does not impede projection of light from the said light source through the last said colour filter section; and motivating means arranged to intermittently shift the said shutter from one said position to the other said position.

10. The combination with a bulletin structure including a display surface of a plurality of relatively spaced units adapted to illuminate the said display surface, the said units being supported forward of the front of the said bulletin structure; each said unit including means to establish and filter light and shutter means to affect projection of coloured light from the said units; actuating means for the said shutter means including a driving element extending from unit to unit and operatively interconnected with the shutter means of each said unit; a motor arranged at the rear of the said bulletin structure; and power transmitting means for transmitting movement from the said motor to the said driving element.

11. The combination with a bulletin structure including a display surface of a plurality of relatively spaced units adapted to illuminate the said display surface, the said units being supported forward of the front of the said bulletin structure; each said unit including means to establish and filter light and shutter means to affect projection of coloured light from the said units; a motor arranged at the rear of the said bulletin structure; and motion transmitting means interconnecting the said motor and the shutter means of each said unit.

12. The combination with a bulletin structure including a display surface of a plurality of relatively spaced units arranged to effect illumination of the said display surface, the said units being supported forward of the front of the said bulletin structure; each said unit including light emitting and filtering means and shutter means adapted to intermittently impede projection of light onto the said display surface; a motor arranged at the rear of the said bulletin structure; and means for transmitting motion from the said motor to the said shutter means of each said unit to effect intermittent and synchronous operation of the said shutter means.

13. The combination with a bulletin structure including a display surface of a plurality of relatively spaced units adapted to effect illumination of the said display surface, the said units being supported forward of the front of the said bulletin structure; each said unit including light emitting and filtering means and shutter means adapted to intermittently affect projection of light onto the said display surface; and means to effect intermittent and synchronous operation of the said shutter means.

14. Display apparatus of the character described including, in combination, a display bearing a plurality of colours, light sources arranged to direct light towards the said display; filters associated with the said light sources and the said display and having a plurality of coloured sections, one at least of which includes a colour deficient in one at least of the said display colours; shutters associated with the said light sources and the said display; and means for moving the said shutters to cause them to recurrently impede light in its passage from the said light sources, through certain sections of the said colour filters to the said display.

15. Display apparatus of the character described including, in combination, a display bearing a plurality of colours, a light source arranged to direct light towards the said display; a filter associated with the said light source and the said display and having a plurality of coloured sections, one at least of which includes a colour which is included in one of the said display colours; a shutter associated with the said light source and the said display surface; and means for moving the said shutter to cause it to recurrently impede light in its passage from the said light source, through certain sections of the said colour filter to the said display.

HENRY ARMSTRONG.